(12) United States Patent
Alm et al.

(10) Patent No.: US 6,220,226 B1
(45) Date of Patent: Apr. 24, 2001

(54) METHOD OF CONTROLLING CHANGES IN TORQUE IN AN INTERNAL COMBUSTION ENGINE AND AN INTERNAL COMBUSTION ENGINE CONTROLLED IN ACCORDANCE WITH SAID METHOD

(75) Inventors: Christer Alm, Hisings Backa; Gote Hansson, Floda, both of (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/418,757

(22) Filed: Oct. 15, 1999

(51) Int. Cl.$^7$ .................................................. F02M 51/00
(52) U.S. Cl. ............................................ 123/492; 123/493
(58) Field of Search .................................. 123/320, 681, 123/682, 683, 399, 492, 493; 180/197

(56) References Cited

U.S. PATENT DOCUMENTS

| | | | |
|---|---|---|---|
| 5,163,530 | * 11/1992 | Nakamura et al. .................. | 180/197 |
| 5,213,178 | * 5/1993 | Polidan et al. .................. | 123/406.23 |
| 5,225,892 | * 7/1993 | Ito et al. .............................. | 123/361 |
| 5,625,558 | * 4/1997 | Togai et al. ........................... | 123/399 |
| 5,899,830 | * 5/1999 | Tabata .................................. | 123/399 |

* cited by examiner

Primary Examiner—Erick Solis
(74) Attorney, Agent, or Firm—Young & Thompson

(57) ABSTRACT

A method of controlling torque changes in a direct injection diesel engine having a control unit which controls the amount of fuel in the engine combustion chambers depending on signals fed into the control unit representing at least accelerator pedal position and engine speed. When the accelerator pedal is depressed, for example, thereby requesting a torque (tq), which exceeds a predetermined upper torque limit (b) stored in the control unit, the torque is first controlled up to a lower torque limit (c) stored in the control unit and from there gradually to the upper torque limit (b), from which the torque is then released up to the torque requested by the driver with the accelerator pedal.

11 Claims, 2 Drawing Sheets

US 6,220,226 B1

METHOD OF CONTROLLING CHANGES IN TORQUE IN AN INTERNAL COMBUSTION ENGINE AND AN INTERNAL COMBUSTION ENGINE CONTROLLED IN ACCORDANCE WITH SAID METHOD

The present invention relates to a method of controlling changes in torque in an internal combustion engine having a control unit, which controls the amount of fuel to the engine combustion chambers dependent on signals fed into the control unit which represent at least the accelerator pedal position and engine speed.

The invention also relates to an internal combustion engine for motor vehicles with an injector for each cylinder and an electronic control unit, controlling the amount of fuel which is injected into the combustion chamber of the respective cylinder, dependent on signals, fed into the control unit, representing at least accelerator position and engine speed.

The fuel injection in vehicle engines with unit injectors can be controlled very carefully and rapidly, which means that the torque from the engine can change quite rapidly. At times this can result in problems for certain parts of the vehicle drive train, i.e. the gearbox, the rear axle and the wheel suspension, which do not handle satisfactorily torque transmission during the rapid torque transients which can occur. The problems manifest themselves in the form of banging and knocking in the gearbox, rear axle and/or the wheel suspension. The rapid torque increases and decreases, which can occur in engines with unit injectors, can also cause such heavy impacts in the drive train that certain types of rear axles and wheel suspensions cannot, in practice, be used unless the changes in torque can be effected in a controlled manner so that the torque transients are dampened.

One purpose of the present invention is to achieve a method of controlling, in an internal combustion engine, torque changes initiated by changes in the accelerator position so that the torque change is effected smoothly and passes the zero torque level in a controlled manner, i.e. the transition from braking to pulling torque or vice versa, to give the rest of the drive train time to take up the gap and eliminate or reduce the twisting up of various chassis components.

This is achieved according to the invention by virtue of the fact that the amount of fuel is controlled in such a manner by the control unit, that a change in the accelerator pedal position from a position representing a current engine torque to a new position representing a requested engine torque and which involves a shift from braking to driving torque or conversely from driving to braking torque, results in signals from the control unit to control the amount of fuel so that an engine torque different from the requested torque is first achieved and that, during a predetermined time interval, the amount of fuel is thereafter gradually controlled towards a level corresponding to the requested or a maximum permitted torque.

An internal combustion engine of the type described by way of introduction is characterized according to the invention in that in the control unit there are stored values of the frictional torque of the engine as a function of engine speed, and values of first and second upper and lower torque limits related to the frictional torque, and that the control unit is arranged, when the accelerator pedal position is changed from a position representing a current engine torque to a new position representing a requested engine torque lying, for opening throttle, above said first upper torque limit or, for closing throttle, below said second lower torque limit, to control the amount of fuel so that an engine torque different from the requested torque is first achieved and that, during a predetermined time interval, the amount of fuel is thereafter controlled towards a level corresponding to the requested or to the maximum permissible torque.

BRIEF DESCRIPTION OF THE DRAWINGS

The invention will be described in more detail with reference to examples shown in the accompanying drawing, where

FIG. 1 shows schematically a turbo-charged six-cylinder four-stroke engine 1 with a gearbox 2 connected thereto. A turbocompressor, generally designated 3, has its turbine portion 4 connected to the exhaust manifold 5 of the engine and its compressor portion 6 connected to the intake conduit 7 of the engine. The engine 1 has a schematically indicated compression braking device 8 of a type known per se, by means of which the cylinders of the engine, during the latter portion of the intake stroke as well as during the latter portion of the compression stroke, can be connected to the engine exhaust manifold 5 to increase the engine braking effect.

Figure 1:
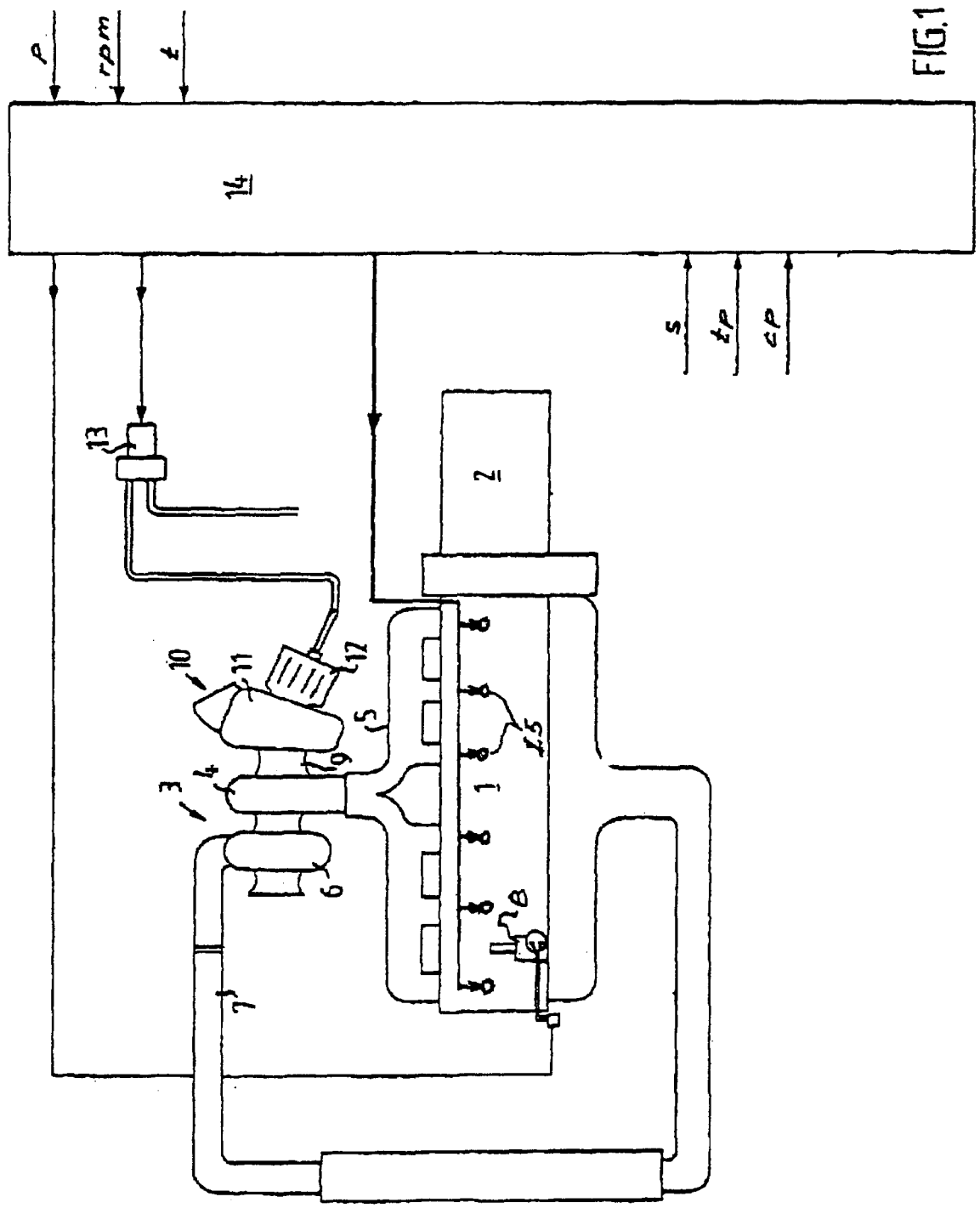
FIG. 1 shows a schematic presentation of an internal combustion engine according to the invention.

The outlet 9 of the turbine 4 opens into an exhaust pressure regulator, generally designated 10, which can be of a type known per se, and it comprises a wastegate housing 11 containing a wastegate (not shown) and a pneumatic control means 12 joined to the wastegate and which communicates via a control valve 13 with a source of compressed air, e.g. the compressed air tank of the vehicle brake system. With the aid of the control means, the wastegate can be continuously adjusted between its completely open and completely closed positions.

An electronic control unit 14 comprising a computer has a number of control functions which are determined by signals, fed into the control unit from various sensors, representing various engine data, such as engine r.p.m., charge pressure (degree of charging) (p) and air temperature (t) as well as vehicle data, such as engine speed (s), accelerator pedal position (tp) and clutch pedal position (cp). In FIG. 1, there is indicated schematically the control of the amount of injected fuel through the engine fuel injectors 15, which can be so-called unit injectors with integrated fuel pump means, and control of the switching on-and-off of the compression braking device 8 and the setting of the exhaust pressure regulator 10 wastegate.

Here, only the control of the fuel injection will be described with reference to the diagrams in FIGS. 2 and 3, where the curves ABC (FIG. 2) and GHIJ (FIG. 3) show the engine, torque on the y-axis as a function of the time on the x-axis. In the diagrams, "a" indicates the friction torque of the engine as a given r.p.m. For a given motor, the friction torque, within the normal engine speed range, can lie within the interval 100–250 Nm. The friction torque as a function of r.p.m. is stored in the computer memory of the control unit 15.

Figure 2:
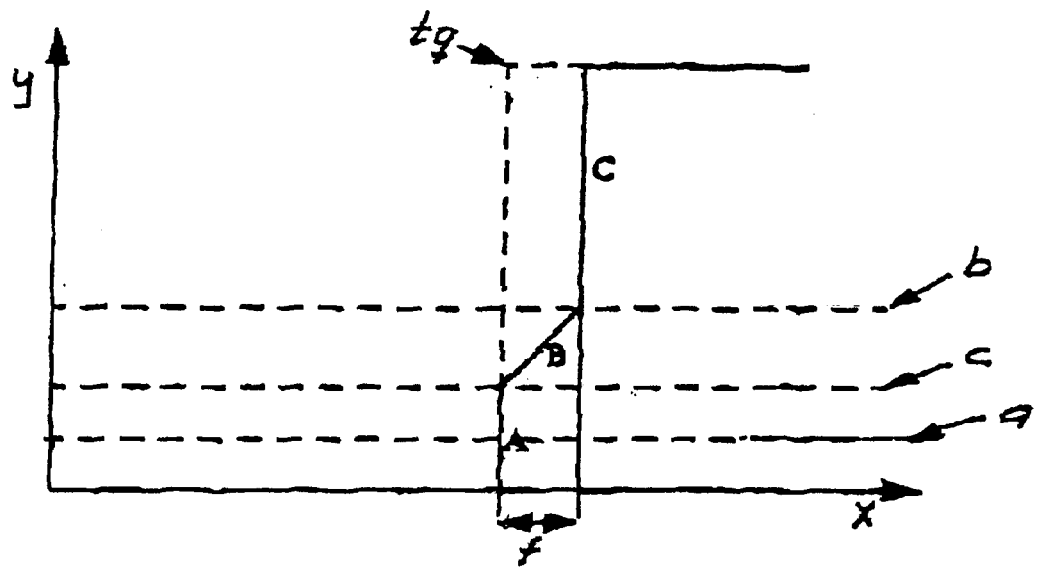
FIG. 2 shows a diagram of the torque control during throttle opening (torque) increase.
Figure 3:
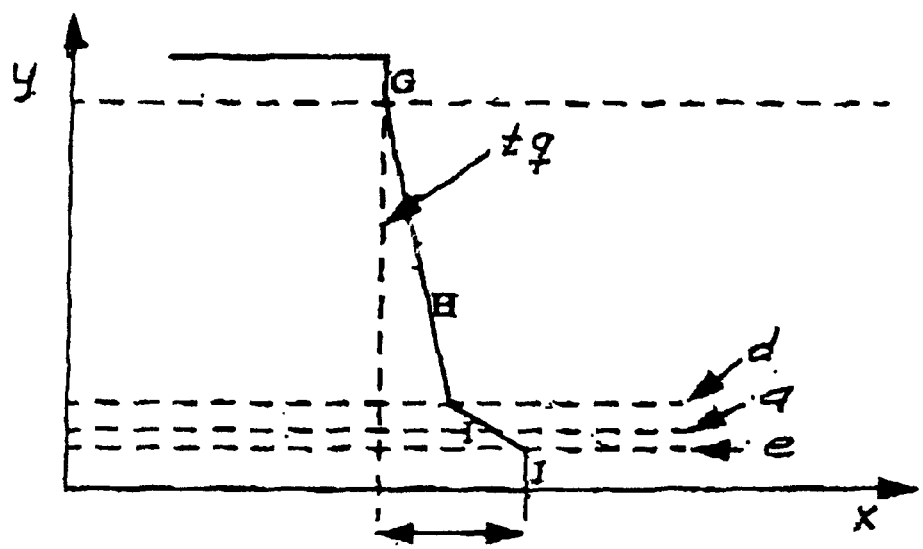
FIG. 3 is a corresponding diagram of torque control during throttle opening (torque) decrease.

In the computer memory of the control unit there is also stored a first upper torque limit "b" which, for the given engine, can lie ca 360 Nm above the friction torque, a first lower torque limit "d" which, for the given engine, can lie ca 200 Nm above the friction torque (see FIG. 2), a second upper torque limit "d", which can lie ca 130 Nm above the friction torque, and finally a second lower torque limit "e", which can lie ca 50 Nm below the friction torque (FIG. 3).

In the diagram in FIG. 2, there is illustrated how the control unit 14 controls the fuel injection for torque change at throttle opening (torque) increase from braking (dragging) torque to a desired driving torque, which is indicated by the dashed line "tq". The requested torque here lies above the first upper torque limit "b", which means that the torque is first allowed to increase along the ramp A to the first lower torque limit "c" and is thereafter limited along the ramp B during a time period of ca 0.1 seconds, as is indicated by the arrows "f" in FIG. 2, until the torque limit "b" has been reached. The torque is then released up along the ramp C until the requested torque, represented by the accelerator pedal position, is reached.

Two different ramps B for increasing torque are programmed into the control unit 14, the first, as shown in FIG. 2, applicable to normal opening of the throttle, i.e. without previous deactivation of activated engine braking devices 8, 10, and secondly a ramp approximately twice the length, i.e. ca 0.2 seconds, and employed for acceleration after the engine braking devices have been activated, so that these devices are given time to let go before too much fuel is injected. The longer ramp for torque increase is primarily optimized to counter smoke generation, which will be the result of fuel injection with the engine brake still activated.

The result of the above described function will be that rapid increases in torque, where the zero-torque line is passed, can be effected without impact in the drive train.

FIG. 3 illustrates in a corresponding manner how the control unit 14 controls the fuel injection when the accelerator pedal is let up to change torque from driving torque to braking (dragging) torque, which lies below the second torque limit "e". When the driver, for example from full throttle, lets up the accelerator pedal rapidly, the torque will follow the curve GHIJ. Since the torque, requested by the driver, can however be greater than that given (limited by full load or smoke inhibitors), the torque is guided directly to the current torque, as illustrated by the ramp G. This is done, on the one hand, so that the ramp times do not need to be adapted to different power variants, but primarily due to the fact that the torque limitation of the smoke inhibitor has a slow operation, and it can at times be a great difference between the requested torque and the permitted torque. For example, it would be unreasonable to activate the ramp from the requested torque of 2500 Nm if the permitted torque was only 1000 Nm. The feel in the pedal would be entirely different. The ramp H is activated, as shown in FIG. 3, when the requested torque is less than the permitted, and it is activated for ca 0.15 seconds, if one starts from maximum torque. When the torque reaches the second upper torque limit "d", the ramp I is activated for ca 0.15 seconds to dampen the passage through the zero-torque line. At the second lower torque limit "e", the torque is allowed to drop along the ramp J to zero.

All of the ramps and the torque limits are freely adjustable in the control unit data base.

The function described provides the greatest usefulness in the lower gear speeds with high torque on the gearbox output shaft when the frame, the propeller shaft, the driving axles and the suspension are tightened up. If the torque is reduced too rapidly, the engine will quickly begin to drag (brake) and all of the play in the drive train will be used when the engine goes over to negative torque. When the frame, the axles and the suspension then strive to spring back, there is no slack in the drive train, and therefore these mass forces will act rigidly against the engine causing banging and knocking in the chassis. The ramp I is therefore optimized to minimize the knocking which normally occurs when the zero-torque line is passed.

If the throttle is suddenly closed, noisy pressure shocks occur in the inlet as a result of the fact that the turbine pressure is reduced so rapidly that the compressor pressure cannot follow it. This is avoided if the torque is reduced along the ramp H.

When the torque is allowed to continue a moment after the driver has let up the gas pedal, which will be case with the above described control function of the control unit 14, this can involve certain disadvantages for rapid shifting, for example. If the driver shifts rapidly, he will depress the clutch pedal at the same instant that he lets up the gas, which results in the engine experiencing an r.p.m. surge, since the engine and the gearbox are disconnected while the engine still has driving torque. In order to solve the specific problem of delay of the reduction in torque when letting up on the gas pedal in connection with shifting, the control unit is disposed to measure the acceleration in engine r.p.m. when the driver lets up on the gas pedal. A certain acceleration limit stored in the control unit then means that the clutch has been disengaged. When his limit is exceeded, the ramps GHIJ are activated and the torque is let down along the curve "tq". The acceleration limit is speed-dependent so that the gradual torque reduction will not always be disengaged when in low gears, where engine acceleration is high compared to high gears.

This function means that the ramps can be optimized without regard to the shifting sequence, i.e. the ramps can be made long without this affecting the interaction between the clutch and the gas pedal when shifting. Since there is no need for a delay of the torque change when the clutch is disengaged, there is also a sensor which directly senses the position of the clutch pedal and provides a signal to the control unit to deactivate the ramps when the clutch is disengaged.

What is claimed is:

1. Method of controlling torque changes in an internal combustion engine having a control unit, which controls the amount of fuel to the engine combustion chambers dependent on signals fed into the control unit which represent at least the accelerator pedal position and engine speed, characterized in that the amount of fuel is controlled in such a manner by the control unit (14), that a change in the accelerator pedal position from a position representing a current engine torque to a new position representing a requested engine torque and which involves a shift from braking to driving torque or conversely from driving to braking torque, results in signals from the control unit to control the amount of fuel so that an engine torque (c,d) different from the requested torque (tq) is first achieved and that, during a predetermined time interval (t), the amount of fuel is thereafter gradually controlled towards a level corresponding to the requested or a maximum permitted torque.

2. Method according to claim 1, characterized in that the amount of fuel is controlled in such a manner when the accelerator pedal position is changed so as to involve torque increase from braking to driving torque lying above a first predetermined upper torque limit (b), that the torque is first limited to a first predetermined lower torque limit (c), that the torque is thereafter, during a predetermined time interval (t), gradually controlled up to the first predetermined upper torque limit (b), and that the torque, when the first predetermined upper torque limit has been reached, is released up to the torque (tq) which is represented by the accelerator pedal position.

3. Method according to claim 1, characterized in that the amount of fuel is controlled in such a manner at a change in the accelerator pedal position as to involve a reduction in torque from a driving to a braking torque lying below a second predetermined lower torque limit (e), that the torque is first controlled, during a predetermined first time interval, down gradually from the current torque (tq) to a second predetermined upper torque limit (d), and that the torque is thereafter, from the second predetermined upper torque limit controlled, during a second predetermined time interval, gradually down towards the second predetermined lower torque limit (e), and that the torque, when the second predetermined lower torque has been reached, is released down to the torque represented by the accelerator pedal position.

4. Method according to claim 2, characterized in that said torque limits are selected based on the magnitude of the frictional torque (a) of the engine at various engine speeds.

5. Method according to claim 4, characterized in that said torque limits are selected so that said first upper and lower torque limits (b,c) and the second upper torque limit (d) lie above the frictional torque of the engine, while the second lower torque limit (e) lies below the frictional torque of the engine.

6. Method according to claim 1, characterized in that the position of a friction clutch arranged between the engine and a gearbox is sensed directly or indirectly and that, upon a change in the accelerator pedal position with a disengaged clutch, the amount of fuel is controlled without delay to a level corresponding to the requested or maximum permitted torque.

7. Method according to claim 2, when controlling torque changes in a diesel engine with compression and/or exhaust braking, characterized in that said time interval (t), during which the torque is gradually controlled from said first lower torque limit (c) to said first upper torque limit (b), is longer for a torque increase following deactivation of an activated compression and/or exhaust brake, than otherwise.

8. Method according to claim 1, characterized in that the acceleration of the engine speed is measured and that the amount of fuel is controlled so that the torque, when the accelerator pedal is let up, will drop to the level requested by the accelerator pedal position or to the permissible level, if the acceleration exceeds a predetermined level stored in the control unit.

9. Internal combustion engine for motorvehicles with an injector for each cylinder and an electronic control unit which controls the amount of fuel which is injected into the combustion chamber of each respective cylinder, depending on signals fed into the control unit representing at least the accelerator pedal position and the engine speed, characterized in that in the control unit (14) there are stored values of the frictional torque (a) of the engine as a function of engine speed, and values of first and second upper and lower torque limits (bcde) related to the frictional torque, and that the control unit is arranged, when the accelerator pedal position is changed from a position representing a current engine torque to a new position representing a requested engine torque (tq) lying, for throttle opening increase, above said first upper torque limit (b) or, for throttle opening decrease, below said second lower torque limit (e), to control the amount of fuel so that an engine torque (c,d) different from the requested torque is first achieved and that, during a predetermined time interval, the amount of fuel is thereafter controlled towards a level corresponding to the requested or to the maximum permissible torque.

10. Internal combustion engine according to claim 9, characterized in that in the control unit (14) there are stored values of said first upper (b) and lower (c) torque limits and said second upper torque limit (d), which lie above the frictional torque (a) of the engine, and values of said second lower torque limit (e) lying below the frictional torque of the engine.

11. Internal combustion engine according to claim 9, characterzed in that the control unit (14) is arranged to measure the acceleration of the engine speed, and, when there is a torque increase resulting in an acceleration exceeding a predetermined level, to control the amount of fuel without delay towards a level corresponding to the torque (tq) requested or the maximum permissible torque.

* * * * *